Figure 1:
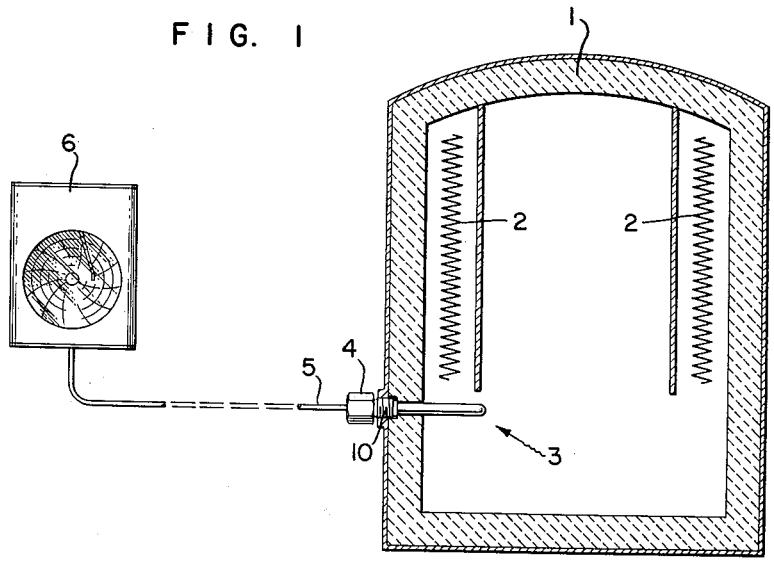

Sept. 12, 1961  R. B. BEARD ET AL  2,999,379

GAS ANALYZING APPARATUS

Filed Feb. 19, 1957

INVENTORS.
RICHARD B. BEARD
ELIAS SNITZER
BY Arthur H. Swanson
ATTORNEY.

United States Patent Office 2,999,379
Patented Sept. 12, 1961

2,999,379
GAS ANALYZING APPARATUS
Richard B. Beard, Philadelphia, Pa., and Elias Snitzer, Lowell, Mass., assignors to Minneapolis-Honeywell Regulator Company, Minneapolis, Minn., a corporation of Delaware
Filed Feb. 19, 1957, Ser. No. 641,150
1 Claim. (Cl. 73—23)

This invention relates to apparatus for the analysis of gases and more particularly for the analysis of hydrogen in a gaseous mixture containing the same.

A general object of this invention is to provide an improved apparatus for the analysis of one of the constituents of a gaseous mixture.

Another object of this invention is to provide an improved apparatus for the analysis of the hydrogen in a gaseous mixture containing the same.

Another object of this invention is to provide an improved apparatus for the separation of hydrogen from a gaseous mixture containing the same.

A specific object of this invention is to provide an improved apparatus for the measurement of the partial pressure of a constituent gas in a gaseous mixture.

Another specific object of this invention is to provide an improved apparatus for the measurement of the partial pressure of hydrogen in a gaseous mixture containing the same.

Another specific object of this invention is to provide an improved partial pressure sensing element for the measurement of the partial pressure of a constituent gas of a gaseous mixture wherein speed of response of the partial pressure sensing element is more rapid to changes of the partial pressure of the constituent gas in one direction than in the other direction.

Another specific object of this invention is to provide an improved hydrogen partial pressure sensing element comprising a hydrogen permeable member constructed of nickel with a palladium coating to speed up the rate of sorption of hydrogen by the member over what it would be for a member constructed entirely of nickel.

Another specific object of this invention is to provide an improved hydrogen partial pressure sensing element comprising a hollow hydrogen permeable member with a coating of palladium on both surfaces to increase the rate of sorption of hydrogen by the member when the partial pressure of hydrogen in the gaseous mixture increases and decreases.

Another specific object of this invention is to provide an improved hydrogen partial pressure sensing element comprising a hollow hydrogen permeable member constructed of nickel with a coating of palladium on one surface thereof.

Another specific object of this invention is to provide an improved hydrogen permeable member composed of nickel with a palladium coating thereon.

It is necessary in many instances to determine the hydrogen content of a mixture of gases containing the same and also to separate the hydrogen from the mixture of gases. In heat treating furnaces, for example, the accurate measurement of the partial pressure of hydrogen in the furnace atmosphere is important in controlling the heat treating operation.

In the analysis of a gaseous mixture to determine the hydrogen content thereof various means have been utilized to separate the hydrogen from the gaseous mixture and determine the partial pressure of hydrogen in the mixture. One of the methods in use is a member which is permeable to hydrogen and non permeable to the other gases in the mixture. Palladium and nickel are among the materials which have been used in this manner which are selectively permeable to hydrogen. In addition a palladium layer on a porous supporting structure, such as porous earthen ware of Alundum, has also been used as a means for separating hydrogen from a mixture of gases containing the same. The use of porous earthen ware or Alundum as a supporting structure has the disadvantage in that should a hole or crack develop in the relatively thin layer of palladium, gases other than hydrogen will penetrate the structure since the earthen ware or Alundum are not selectively permeable to hydrogen and will allow other gases to penetrate the structure. By the use of a palladium coating on a nickel supporting structure a crack or hole in the palladium coating still leaves the structure selectively permeable to hydrogen since nickel has this property also. In addition, the use of the nickel supporting structure retains the lower cost inherent in using a thin coating of palladium rather than a member constructed solely of palladium.

The penetration of hydrogen through a member permeable thereto consists generally of three steps; sorption, diffusion, and desorption. The sorption takes place at the gas metal interface where the gas enters the metal, the diffusion is the progress of the gas through the metal, and the de-sorption step is the passage of the gas from the metal into the atmosphere at the other gas metal interface. Since nickel and palladium are both selectively permeable to hydrogen, a member constructed of either material may be used to separate hydrogen from a gaseous mixture containing the same or to allow hydrogen to pass through the walls of a hollow tube constructed of either of these materials to determine the partial pressure of the hydrogen in the gaseous mixture. However, because of the high cost of palladium, it is not desirable to construct the hydrogen permeable member wholly of palladium. Palladium is however superior to nickel as a hydrogen permeable member in that the sorption rate of hydrogen into palladium is much more rapid than the sorption rate of hydrogen into nickel. Therefore, by plating the nickel with a layer of palladium, the sorption of hydrogen takes place at the palladium gas interface resulting in a faster permeation rate of the hydrogen through the member than through nickel alone.

In a heat treating furnace where the partial pressure of hydrogen is to be determined a preferred form of hydrogen permeable member consists of a hollow tube of nickel closed at one end with a pressure measuring device connected to the other end to measure the internal pressure of the tube. The nickel tube is coated on the outside and inside surfaces with palladium to increase the sorption rate of hydrogen entering and leaving the tube. The tube is inserted through the wall of the furnace exposing the outer layer of palladium to the furnace atmosphere. The hydrogen in the furnace atmosphere will penetrate the hollow tube until the pressure of hydrogen in the tube is equal to the partial pressure of the hydrogen in the furnace atmosphere. As the partial pressure of the hydrogen in the furnace atmosphere fluctuates, hydrogen will travel into or out of the hollow tube to equalize the hydrogen pressure within the tube to the partial pressure of the hydrogen in the furnace atmosphere. With the palladium coating on the inside as well as the outside walls of the nickel supporting structure, the sorption rate of the hydrogen leaving and entering the tube will be the same. By the use of these palladium coatings, the time required for the hydrogen pressure inside the tube to follow the fluctuations of the partial pressure of hydrogen outside the tube is more rapid than would be the case of a wholly nickel tube.

Should it be desired to have the apparatus respond more quickly to rises in the partial pressure of hydrogen than to drops in the partial pressure, this can be done by merely coating the outer wall of the nickel tube with palladium and leaving the inner wall uncoated.

Thus, on an increase in the partial pressure of hydrogen, the hydrogen must travel into the tube and will have the advantage of the higher sorption rate of palladium, whereas on a drop in the partial pressure of hydrogen in the furnace atmosphere, the hydrogen must leave the tube and the sorption will take place on the inner nickel wall resulting in a slower sorption rate.

In like manner, should it be desired to have a more rapid response to drops in the partial pressure of hydrogen, the inner wall of the nickel tube would be coated with palladium and the outer wall left uncoated.

Figure 2:
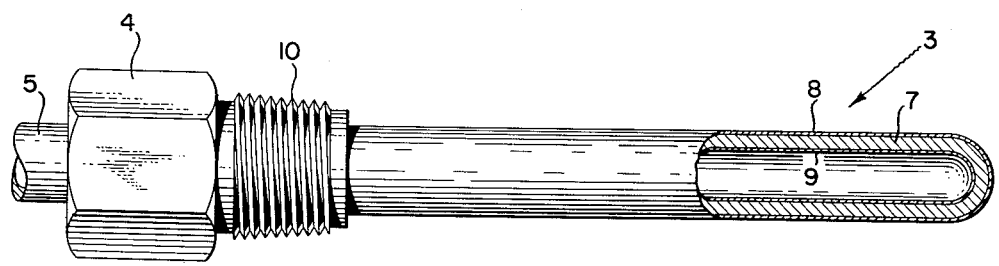

A better understanding of the present invention may be had from the following description read with reference to the accompanying drawings of which:

FIG. 1 shows apparatus for measuring the partial pressure of hydrogen in a heat treating furnace; and FIG. 2 shows an enlarged view of the hydrogen partial pressure sensing element.

Referring to FIG. 1, the numeral 1 represents a heat treating furnace which may be used to apply an appropriate "case" to metals which are placed therein. Part of the heating for the furnace 1 is obtained from electrical heaters 2 which are effective to maintain the desired temperature within the furnace 1 by means not shown.

In a heat treating atmopshere used in carburizing the metal treated, hydrogen is one of the principal constituents of the atmosphere for determining the manner in which this carburizing of the treated metal will take place. Since generally the hydrogen content of the gases supplied to the furnace 1 is not constant it is essential that some means be provided to measure the hydrogen content so that suitable corrective action may be taken.

A hydrogen partial pressure measuring element 3 projects through the wall of the furnace 1 into the furnace atmosphere and is arranged to threadedly engage the wall of the furnace 1 for support by means of a threaded portion 10. An output pressure connection 4 connects to a conduit 5 and is used to apply the internal pressure of the element 3 to an instrument 6 which will indicate and record the internal pressure of the element 3. The instrument 6 may well take the form of the apparatus shown in the patent to E. C. Burdick, No. 2,548,943.

Referring to FIG. 2 there is shown an enlarged partially cutaway view of the hydrogen partial pressure sensing element 3 together with the output pressure connection 4. The element 3 is seen to consist of a hollow tube 7 composed of nickel closed at one end, with a palladium outer layer 8, and a palladium inner layer 9. The palladium layers 8 and 9 may be coated on the nickel tube 7 by any appropriate means such as by electroplating. At the end of the hydrogen partial pressure sensing element 3 next to the output pressure connection 4 is a threaded portion 10 suitable for threadably engaging the threaded portion of the wall of the furnace 1 through which the element 3 protrudes.

In the operation of the apparatus the electrical heaters 2 heat the furnace atmosphere and the nickel tube 7 together with the palladium layers 8 and 9. At the temperatures to which they are heated the palladium layers 8 and 9 and the nickel tube 7 are selectively permeable to hydrogen. As is well known, the hydrogen in the furnace atmosphere will penetrate the palladium layers 8 and 9 and the nickel tube 7 and pass into the interior of partial pressure measuring element 3 until the pressure of the hydrogen in the element 3 equals the partial pressure of the hydrogen in the furnace atmosphere. The instrument 6 will thus provide an indication and record of the partial pressure of the hydrogen in the furnace atmosphere by measuring the pressure in the element 3. As the partial pressure of the hydrogen in the furnace atmosphere varies, hydrogen will pass into or out of the element 3 until the internal pressure of the element 3 is equal to the partial pressure of the hydrogen in the furnace atmosphere. The palladium and nickel, not being permeable to the gases in the furnace atmosphere other than hydrogen, effectively separates the hydrogen from these gases.

Since the sorption rate of hydrogen into palladium is much more rapid than the sorption rate of hydrogen into nickel when the hydrogen is passing into the element 3 from the furnace atmosphere the rate of sorption at the gas-metal interface of the outer palladium layer 8 is much more rapid than it would be if the metal were nickel. Thus, on an increase in the partial pressure of hydrogen in the furnace atmosphere the rate at which the hydrogen pressure in the element builds up to equal the partial pressure of hydrogen in the furnace atmosphere is increased over what it would be if the metal at the gas-metal interface were nickel. In going from the palladium layer 8 into and through the nickel tube 7 the hydrogen is in the diffusion stage. The rate of diffusion of hydrogen in nickel is not appreciably different from the diffusion rate of hydrogen in palladium.

When the partial pressure of the hydrogen in the furnace atmosphere decreases the hydrogen will now travel from the interior of the element 3 to the furnace atmosphere to equalize the pressure. Here again the presence of the palladium layer 9 on the inside of the nickel tube 7 increases the sorption rate and permits the element 3 to follow the changes of the partial pressure of hydrogen in the furnace atmosphere more rapidly.

The use of these relatively thin layers of palladium 8 and 9 over the nickel tube 7 thus permits a device having the advantages of palladium for hydrogen separation and measurement without the high cost of a tube made completely of palladium. In addition, since the nickel tube 7, over which the palladium layers 8 and 9 are coated, is also selectively permeable to hydrogen should any cracks or holes develop in the palladium coating, gases other than hydrogen in the furnace atmosphere would not enter the element 3 to introduce errors.

If it is desired that the partial pressure sensing element 3 respond more rapidly to increases in the partial pressure of hydrogen in the furnace atmosphere than to decreases, this can be accomplished by eliminating the palladium layer 9 on the inside wall of the nickel tube 7 and retaining the palladium layer 8 on the outside wall of the nickel tube. With this structure on an increase in hydrogen partial pressure in the furnace atmosphere, the hydrogen will travel from the furnace atmosphere into the element 3 and the sorption will take place on the palladium layer 8. However, on a decrease in the partial pressure of hydrogen in the furnace atmosphere since the sorption takes place on the inner surface of the tube 7, the rate of sorption of hydrogen will be that of nickel which is considerably slower than palladium. Therefore, a hydrogen partial pressure sensing element which responds more rapidly to increase than to decreases in the partial pressure of hydrogen i made possible.

In like manner, if it is desired to have a hydrogen partial pressure sensing element which responds mor rapidly to decreases than to increases in the partial pres sure of the hydrogen in the furnace atmosphere thi can be accomplished by eliminating the palladium laye 8 on the outside surface of the nickel tube 7 and retair ing the palladium layer on the inside surface of th nickel tube 7. Thus, since on a decrease in the parti: pressure of hydrogen the hydrogen in the sensing el ment will permeate the tube and pass to the atmospher the sorption will take place at the surface of the pallad um layer 8 resulting in a rapid rate of sorption. Wher as on an increase in the partial pressure of the hydr gen in the furnace atmosphere the sorption will tal place at the surface of the nickel tube 7 resulting in lower sorption rate than that which takes place at tl palladium surface.

What is claimed is:

Apparatus for rapidly sensing the partial pressure of hydrogen in a heated atmosphere containing other gases upon a flow of hydrogen through said apparatus due to the rate of sorption of hydrogen into palladium being greater than the rate of sorption of hydrogen into nickel, said apparatus comprising, a nickel tube which sorbs hydrogen and through which hydrogen diffuses at high temperatures, a coating of palladium on one surface wall thereof, which coating sorbs hydrogen and through which coating hydrogen diffuses at high temperatures, a coating of palladium on the other surface wall of said nickel tube, which coating sorbs hydrogen and through which coating hydrogen diffuses at high temperatures, means supporting a portion of said tube in said heated atmosphere, means to bring the heated atmosphere into contact with one wall of said tube, and an outlet for gas from the other wall of said tube and adapted for connection to partial-pressure-sensing means.

References Cited in the file of this patent

UNITED STATES PATENTS

| | | |
|---|---|---|
| 1,174,631 | Snelling | Mar. 7, 1916 |
| 2,456,163 | Watson | Dec. 14, 1948 |
| 2,536,610 | King et al. | Jan. 2, 1951 |
| 2,787,903 | Beard | Apr. 9, 1957 |
| 2,811,037 | Beard | Oct. 29, 1957 |

OTHER REFERENCES

Text: Metals Reference Book—Smithells, 1st Edition (Interscience Publishers, New York), 1944, pages 387, 388.